(12) United States Patent
Urakawa et al.

(10) Patent No.: US 11,101,660 B2
(45) Date of Patent: Aug. 24, 2021

(54) STORAGE BATTERY SYSTEM AND POWER DISPLAY DEVICE

(71) Applicant: SUMITOMO ELECTRIC INDUSTRIES, LTD., Osaka (JP)

(72) Inventors: Fumio Urakawa, Osaka (JP); Tetsuo Akita, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/617,969

(22) PCT Filed: May 23, 2018

(86) PCT No.: PCT/JP2018/019831
§ 371 (c)(1),
(2) Date: Nov. 27, 2019

(87) PCT Pub. No.: WO2018/221347
PCT Pub. Date: Dec. 6, 2018

(65) Prior Publication Data
US 2020/0112175 A1    Apr. 9, 2020

(30) Foreign Application Priority Data

May 29, 2017   (JP) .............................. JP2017-105530

(51) Int. Cl.
*H02J 3/38* (2006.01)
*H02J 11/00* (2006.01)
*H02J 13/00* (2006.01)

(52) U.S. Cl.
CPC ........ *H02J 3/381* (2013.01); *H02J 13/00001* (2020.01)

(58) Field of Classification Search
CPC .......... H02J 13/00001; H02J 3/32; H02J 3/38; H02J 3/381; H02J 7/34; H02J 7/35;
(Continued)

(56) References Cited

U.S. PATENT DOCUMENTS

| | | | | |
|---|---|---|---|---|
| 2013/0154570 A1* | 6/2013 | Nomura | .................... | H02J 3/32 320/128 |
| 2014/0091622 A1* | 4/2014 | Lucas | ....................... | H02J 3/32 307/19 |
| 2017/0288416 A1* | 10/2017 | Yamaguchi | ............... | H02J 1/04 |

FOREIGN PATENT DOCUMENTS

| | | |
|---|---|---|
| JP | 2002-247765 A | 8/2002 |
| JP | 2010-130836 A | 6/2010 |

(Continued)

*Primary Examiner* — Toan T Vu
(74) *Attorney, Agent, or Firm* — Baker Botts L.L.P.; Michael A. Sartori (57) ABSTRACT

A storage battery system includes: a grid-connected storage battery; and a first current sensor that is provided in an electrical circuit linking the storage battery and the grid and detects a current in the electrical circuit the storage battery system having the electrical circuit connected with one or more power generators. The storage battery system includes: a second current sensor that is provided in the electrical circuit such that the one or more power generators are connected between the first current sensor and the second current sensor; and a controller that calculates generated power of the one or more power generators based on outputs obtained from the first current sensor and the second current sensor.

6 Claims, 6 Drawing Sheets

(58) Field of Classification Search
CPC .. H02J 13/00; H02J 13/00034; H02J 2300/22; Y02E 60/00; Y02E 40/70; Y04S 10/123; Y04S 10/14
USPC ...................................... 307/84, 19; 320/128
See application file for complete search history.

(56) References Cited

FOREIGN PATENT DOCUMENTS

| | | | |
|---|---|---|---|
| JP | 2013-051834 A | | 3/2013 |
| JP | 2014-039352 A | | 2/2014 |
| JP | 2014039362 | * | 2/2014 |
| JP | 2014-217217 A | | 11/2014 |
| JP | 2014217217 | * | 11/2014 |
| JP | 2016-063722 A | | 4/2016 |

* cited by examiner

STORAGE BATTERY SYSTEM AND POWER DISPLAY DEVICE

TECHNICAL FIELD

The present invention relates to a storage battery system and a power display device.

This application claims priority to Japanese Patent Application No. 2017-105530 filed on May 29, 2017, the entire contents of which are incorporated by reference herein.

BACKGROUND ART

A power generator such as a solar power generator installed in a general household or the like may be used in combination with a storage battery system.

As the storage battery system used in combination with the power generator as thus described includes, in addition to one that is grid-connected using a power conditioner (inverter) included in the power generator (e.g., see Patent Literature 1), there is a storage battery system that can be grid-connected and autonomously operated by having a power conditioner.

The storage battery system, which has a power conditioner and is autonomously operable, generally includes a power display device configured to display the present discharge (or generated) power in a consumer, traded power, and power consumption in the consumer.

The storage battery system includes a reverse current detection sensor configured to detect a reverse current due to the need for controlling the power of the own system so as not to flow reversely.

Unless a power generator other than the storage battery system is installed, the power display device can calculate and display the various types of power described above based on the output of the reverse current detection sensor and the generated power of the own system.

CITATION LIST

Patent Literature

Patent Literature 1: Japanese Unexamined Patent Publication No. 2016-063722

SUMMARY OF INVENTION (1) A storage battery system according to an embodiment is a storage battery system including: a grid-connected storage battery; and a first current sensor that is provided in an electrical circuit linking the storage battery and the grid and detects a current in the electrical circuit, the storage battery system having the electrical circuit connected with one or more power generators. The storage battery system includes: a second current sensor that is provided in the electrical circuit such that the one or more power generators are connected between the first current sensor and the second current sensor; and a controller that calculates generated power of the one or more power generators based on outputs obtained from the first current sensor and the second current sensor.

(2) A power display device according to another embodiment is a power display device used for a storage battery system that includes a grid-connected storage battery, and a first current sensor that is provided in an electrical circuit linking the storage battery and the grid and detects a current in the electrical circuit, the storage battery system having the electrical circuit connected with one or more power generators. The power display device includes: a second current sensor that is provided in the electrical circuit such that the one or more power generators are connected between the first current sensor and the second current sensor; and a controller that calculates generated power concerning the one or more power generators based on outputs obtained from the first current sensor and the second current sensor.

DESCRIPTION OF EMBODIMENTS

Problem to be Solved by Present Disclosure

In recent years, after the installation of a power generator (storage battery system), a power generator may be added to expand the configuration of the power generator in the consumer.

For example, when a new power generator is added to a consumer in which the autonomously operable storage battery system described above is installed, in order to display the generated power of the added new power generator on the power display device of the storage battery system, the storage battery system needs to acquire the generated power of the new power generation apparatus.

In such a case, in the storage battery system, a sensor has been provided on a line path for connection to the new power generator to a grid to acquire information on the generated power of the new power generator.

Figure 6A:
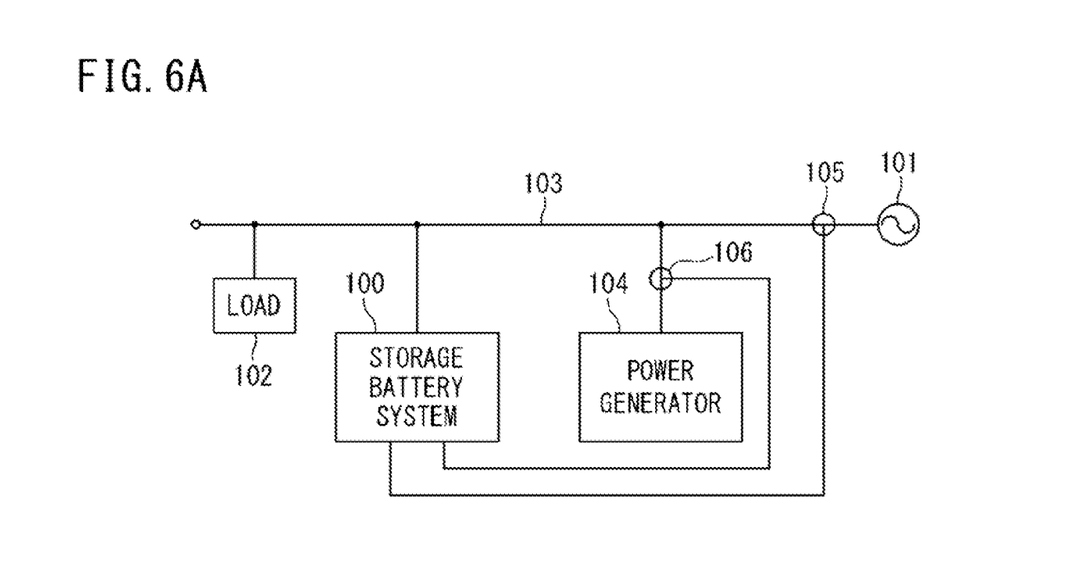
FIG. 6A is a diagram showing a conventional configuration example in a case where a power generator is added in addition to the existing storage battery system.

FIG. 6A is a diagram showing a conventional configuration example in a case where a power generator is added in addition to the existing storage battery system.

The configuration shown in FIG. 6A shows the case of the so-called single power generation. As shown in FIG. 6A, the storage battery system 100 is connected to an electrical circuit 103 linking a commercial power grid 101 and a load 102 in a consumer. A newly installed power generator 104 is, for example, a solar power generator, a fuel cell power generator, or the like and is connected between the storage battery system 100 and the commercial power grid. A current sensor 105 for reverse power detection included in the storage battery system 100 is connected between the power generator 104 and the commercial power grid 101.

The storage battery system 100 includes a current sensor 106 provided between the electrical circuit 103 and the power generator 104 in order to detect the power generated by the power generator 104.

The power display device of the storage system 100 is configured to acquire information on the power generated by the added power generator 104 with the current sensor 106 and display the generated power of the added power generator 104.

Figure 6B:
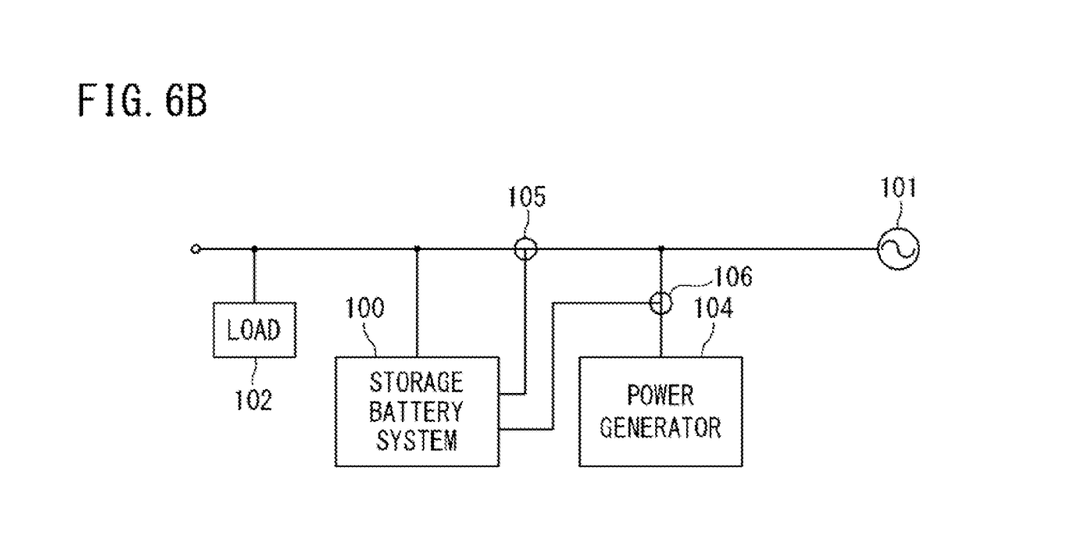
FIG. 6B is another conventional configuration example in a case where a power generator is added in addition to the existing storage battery system.

FIG. 6B is a diagram showing another conventional configuration example in a case where a power generator is added in addition to the existing storage battery system.

The configuration shown in FIG. 6B shows the case of so-called double power generation. As shown in FIG. 6B, the newly installed power generator 104 is connected between the current sensor 105 for reverse power detection and the commercial power grid 101.

Also, in this case, the storage battery system 100 includes a current sensor 106 provided between the electrical circuit 105 and the power generator 104 in order to detect the amount of power generated by the power generator 104.

In the configuration shown in FIGS. 6A and 6B, each time a power generator is added, unless a current sensor for the new power generator is provided in (the power display device of) the storage battery system 100, the generated power of the new power generator cannot be obtained, and appropriate display cannot be performed.

Therefore, every time a power generator is newly added, cost for installing a current sensor is generated, and when a large number of power generators are added, the cost becomes excessive.

The present disclosure has been made in view of such circumstances, and an object of the present disclosure is to provide a storage battery system and a power display device capable of performing display coping with the addition of a power generator at low cost.

Advantageous Effects of Present Disclosure

According to the present disclosure, it is possible to perform display coping with the addition of a power generator at low cost.

Description of Embodiments

Hereinafter, the contents of the embodiments will be listed and described.

(1) A storage battery system according to an embodiment is a storage battery system including: a grid-connected storage battery; and a first current sensor that is provided in an electrical circuit linking the storage battery and the grid and detects a current in the electrical circuit, the storage battery system having the electrical circuit connected with one or more power generators. The storage battery system includes: a second current sensor that is provided in the electrical circuit such that the one or more power generators are connected between the first current sensor and the second current sensor; and a controller that calculates generated power of the one or more power generators based on outputs obtained from the first current sensor and the second current sensor.

According to the storage battery system having the above configuration, since the second current sensor is provided in the electrical circuit such that one or more power generators are connected between the first current sensor and the second current sensor, even when a new power generator is added, the controller can calculate power generated by one or more power generators based on the output of the first current sensor and the output of the second current sensor even without provision of a new current sensor corresponding to the added power generator. As a result, it is possible to perform display coping with the addition of the power generator at low cost.

(2) In the storage battery system, it is preferable that the controller calculate a difference between power obtained based on the output of the first current sensor and power obtained based on the output of the second current sensor as generated power of the one or more power generators.

(3) In the storage battery system, it is preferable that the electrical circuit be a single-phase three-wire system including a neutral line, and the second current sensor be provided in one of two power lines except for the neutral line.

In this case, the appropriate display can be performed with a minimum configuration.

(4) In the storage battery system, the electrical circuit may be a single-phase three-wire system including a neutral line, and the second current sensor may be provided in each of two power lines except for the neutral line.

In this case, the generated power of one or more power generators can be calculated more accurately.

(5) In the storage battery system, the second current sensor may be provided closer to the grid than the first current sensor is. This configuration can be applied to a storage battery system and a system in which the so-called double power generation is adopted to control the storage battery system so as to also discharge when one or more power generators are generating power.

(6) Further, a power display device according to another embodiment is a power display device used for a storage battery system that includes a grid-connected storage battery, and a first current sensor that is provided in an electrical circuit linking the storage battery and the grid and detects a current in the electrical circuit, the storage battery system having the electrical circuit connected with one or more power generators. The power display device includes: a second current sensor that is provided in the electrical circuit such that the one or more power generators are connected between the first current sensor and the second current sensor; and a controller that calculates generated power concerning the one or more power generators based on outputs obtained from the first current sensor and the second current sensor.

Details of Embodiments

Hereinafter, preferred embodiments will be described with reference to the drawings.

Note that at least a part of each embodiment described below may be combined in a freely selectable manner.

First Embodiment

Figure 1:
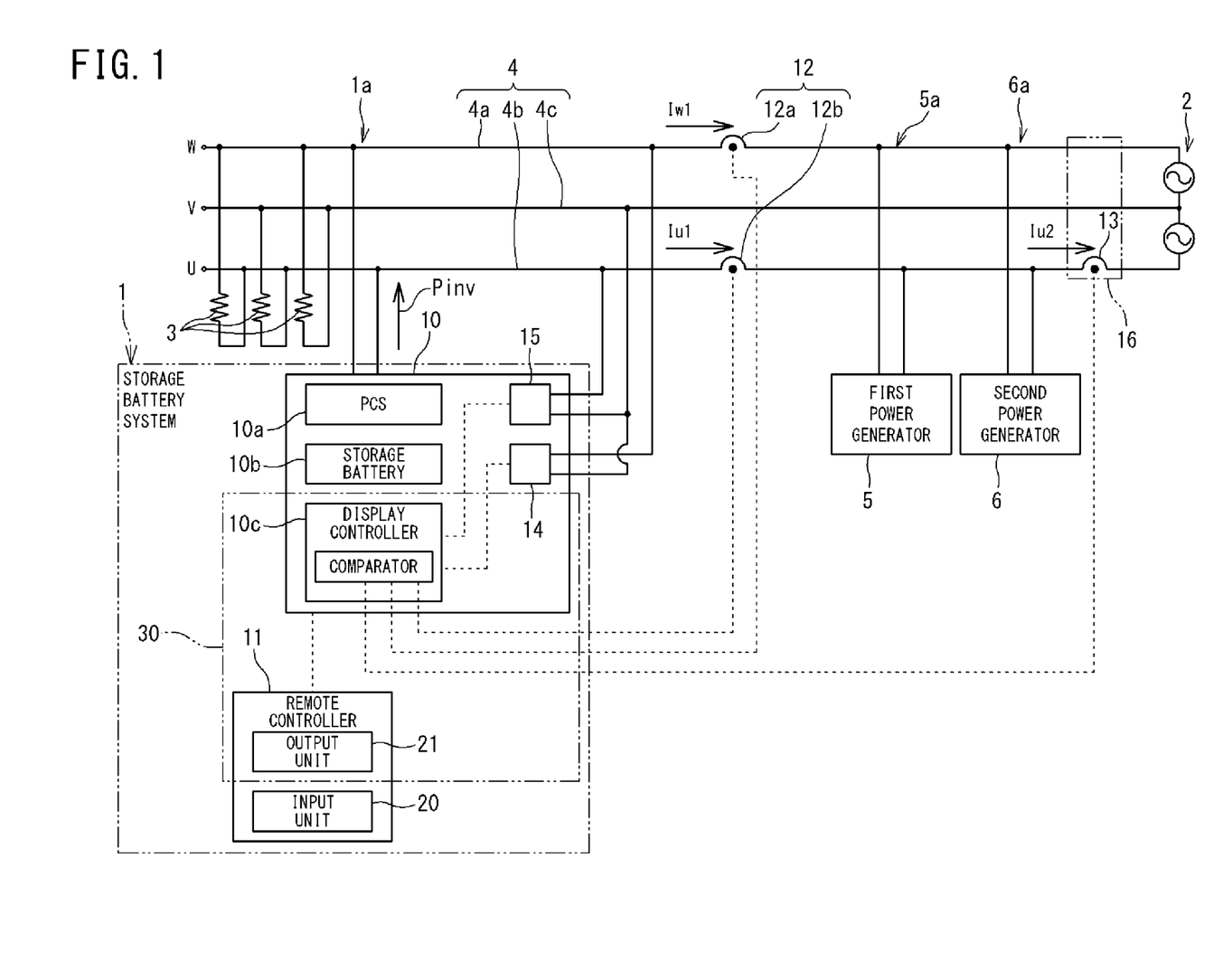
FIG. 1 is a diagram showing an equipment configuration in a consumer in which a storage battery system according to a first embodiment is installed.

FIG. 1 is a diagram showing an equipment configuration in a consumer in which a storage battery system 1 according to a first embodiment is installed.

As shown in FIG. 1, the storage battery system 1 is connected to an electrical circuit 4 linking a commercial power grid 2 and a general load 3 in a consumer.

The electrical circuit 4 is a single-phase three-wire system, and includes a first power line 4a that is a w-phase, a second power line 4b that is a u-phase, and a third power line 4c that is a neutral line.

In addition to the storage battery system 1, a first power generator 5 and a second power generator 6 are connected to the electrical circuit 4. Each of the first power generator 5 and the second power generator 6 is, for example, a solar power generator, a fuel cell power generator, or the like. The first power generator 5 and the second power generator 6 are added after the installation of the storage battery system 1 and are connected between two lines of the first power line 4a and the second power line 4b in the electrical circuit 4.

Further, the first power generator 5 and the second power generator 6 are connected to positions between the commercial power grid 2 and a connection 1a to which the storage battery system 1 is connected in the electrical circuit 4.

Each of the first power generator 5 and the second power generator 6 includes a power conditioner (not shown) for grid connection to the commercial power grid 2 and a power generation unit for generating power, and is configured to supply power generated by the power generation unit to the general load 3 via the electrical circuit 4.

In addition, the first power generator 5 and the second power generator 6 may be configured to make the generated power tradable by allowing the generated power to flow reversely to the commercial power grid 2 side, or may be configured to make the generated power non-tradable by limiting the reverse flow.

When configured to limit the reverse flow so as to make the generated power non-tradable, the first power generator 5 and the second power generator 6 have sensors (not shown) for detecting the reverse flow of the power generated by their own generators. The sensor is provided in the first power line 4a and the second power line 4b. Each of the first power generator 5 and the second power generator 6 is configured to perform load following control based, for example, on the output of the sensor and the generated power of the own generator so that the generated power of the own generator does not flow reversely.

In the present embodiment, the first power generator 5 is configured to make the generated power tradable by allowing the generated power to flow reversely to the commercial power grid 2 side, and the second power generator 6 is configured to make the generated power non-tradable by limiting the reverse flow.

The storage battery system 1 includes a main unit 10 having a first voltage sensor 14 and a second voltage sensor 15, a remote controller 11, a reverse current detection sensor 12, and a generated-power detecting current sensor 13. The storage battery system 1 includes a storage battery 10b in the main unit 10 as described later, and is configured to supply the discharge power of the storage battery 10b to the general load 3 via the electrical circuit 4 and to store the power into the electrical circuit 4.

The reverse current detection sensor 12 is a sensor for detecting a reverse current in which the discharge current of the own system 1 flows to the commercial power grid 2 side, and the reverse current detection sensor 12 is provided between the connection 1a to which the storage battery system 1 is connected in the electrical circuit 4 and a connection 5a to which the first power generator 5 is connected. The reverse current detection sensor 12 includes a first current sensor 12a and a second current sensor 12b.

The first current sensor 12a is provided in the first power line 4a. The second current sensor 12b is provided in the second power line 4b.

The first current sensor 12a is connected to the main unit 10 and provides the main unit 10 with a sensor output that is a result of detecting the current of the first power line 4a. The second current sensor 12b is also connected to the main unit 10 and provides the main unit 10 with a sensor output that is a result of detecting the current of the second power line 4b.

The generated-power detecting current sensor 13 is a sensor for detecting a current necessary to calculate the generated power of a power generator other than the own system 1, and is provided between the commercial power grid 2 and a connection 6a to which the second power generator 6 is connected in the electrical circuit 4. More specifically, the generated-power detecting current sensor 13 is provided, for example, on the primary-side wiring in a distribution board 16 provided in the consumer.

The generated-power detecting current sensor 13 is provided in the second power line 4b.

The generated-power detecting current sensor 13 is connected to the main unit 10 and provides the main unit 10 with a sensor output that is a result of detecting the current.

Each of the current sensors 12a, 12b, 13 is formed of, for example, a current transformer (CT) or the like.

The first voltage sensor 14 is connected between the first power line 4a and the third power line 4c. The first voltage sensor 14 provides a display controller 10c of the main unit 10, described later, with a sensor output that is a result of detecting a voltage between the first power line 4a and the third power line 4c.

The second voltage sensor 15 is connected between the second power line 4b and the third power line 4c. The second voltage sensor 15 provides the display controller 10c of the main unit 10, described later, with a sensor output that is a result of detecting a voltage between the second power line 4b and the third power line 4c.

The main unit 10 includes a power conditioner (inverter) 10a, the storage battery 10b, and a display controller 10c.

The storage battery 10b is, for example, a secondary battery such as a lithium-ion battery. The storage battery 10b is grid-connected via the power conditioner 10a, supplies discharge power to the general load 3 via the first power line 4a and the second power line 4b, and stores the power flowing in the first power line 4a and the second power line 4b.

The power conditioner 10a (hereinafter also referred to as PCS 10a) is connected to the first power line 4a and the second power line 4b and has a function of grid-connecting the storage battery 10b to the commercial power grid 2. Further, the PCS 10a has a function of performing control concerning the charge/discharge of the storage battery 10b based on a value or the like of each of the respective sensors 12, 13, 14, 15.

The PCS 10a is configured to perform load following control based on the output of each of the sensors including the reverse current detection sensor 12 and the discharge power of the own generator so that the discharge power of the own system 1 (storage battery 10b) does not flow reversely.

In the present embodiment, the so-called double power generation is adopted in which during the power generation of the first power generator 5, the storage battery system 1 also discharges power.

Therefore, even during the power generation of the first power generator 5, the PCS 10a controls the discharge power of the storage battery 10b.

In the present embodiment, the double power generation can be adopted by providing the generated-power detecting current sensor 13 closer to the commercial power grid 2 than the reverse current detection sensor 12 is. This is because it is possible to cause the reverse current detection sensor 12 to detect only the reverse flow of the discharge power of the storage battery system 1.

The display controller 10c calculates the respective values of various types of power (generated power, consumed power, traded power, and charge/discharge power of the storage battery 10b) in the consumer where the own system 1 is installed based on sensor outputs or the like provided from each of the sensors 12, 13, 14, 15. When calculating the values of the various types of power, the display controller 10c has a function of providing power information indicating the values of the various types of power to the remote controller 11 for display. That is, the display controller 10c constitutes a controller that performs control concerning the display of the generated power of each of the first power generator 5 and the second power generator 6 based on the above sensor outputs.

The remote controller 11 has a function of receiving an operation input from an operator of the storage battery system 1 and has a function of displaying various pieces of information to the operator. The remote controller 11 has an input unit 20 for receiving an operation input from the operator and an output unit 21 for displaying various pieces of information to the operator.

Figure 2:
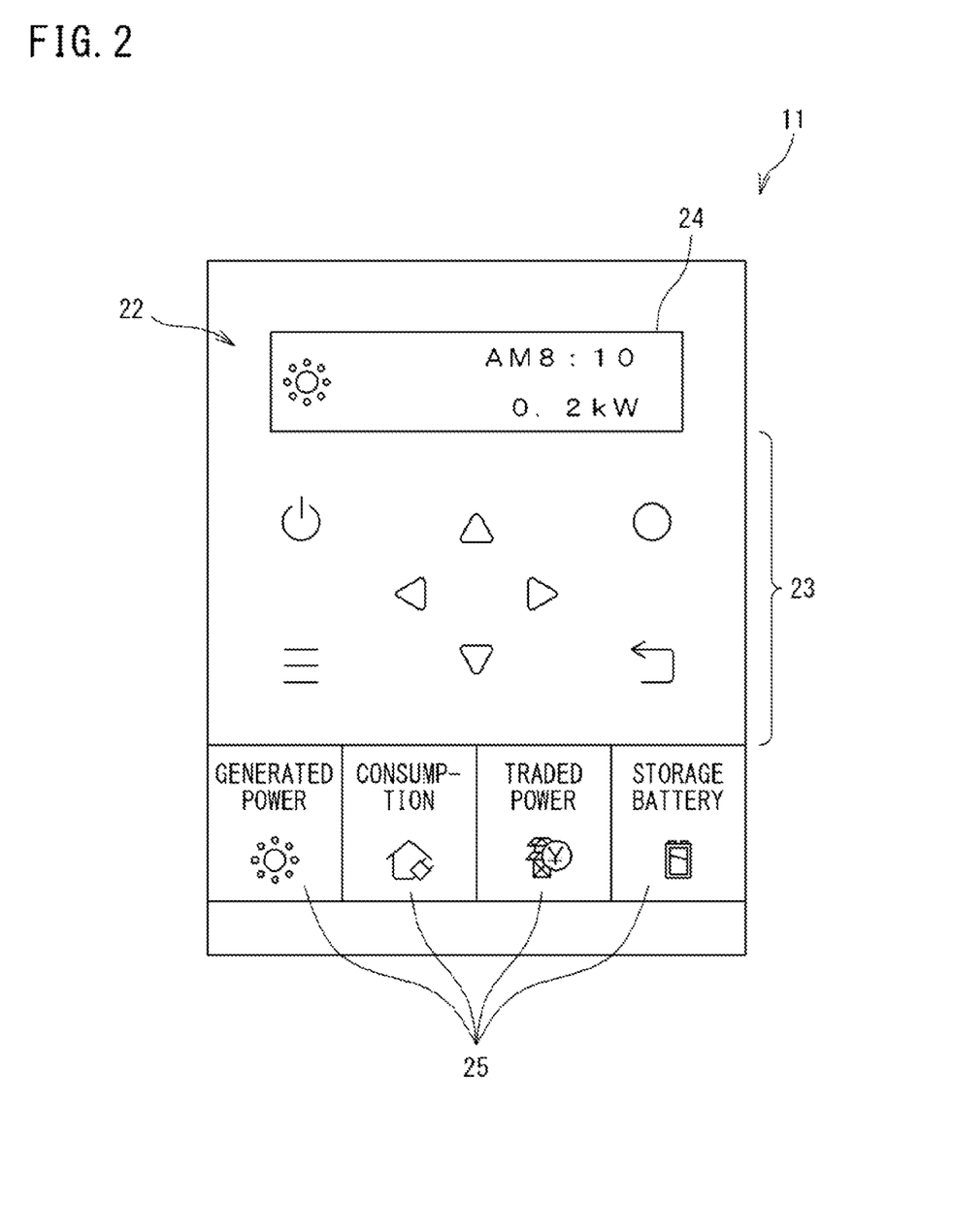
FIG. 2 is a front view of an operation panel of a remote controller 11.

FIG. 2 is a front view of an operation panel of the remote controller 11.

As shown in FIG. 2, an operation panel 22 of the remote controller 11 is provided with an operation switch group 23 to be operated by the operator, a liquid crystal display device 24, and four display changeover switches 25.

The input unit 20 (FIG. 1) includes the operation switch group 23 of the operation panel 22. The input unit 20 receives an operation input by the operator using the operation switch group 23. The input unit 20 provides the PCS 10a of the main unit 10 with a command corresponding to the received operation input by the operator.

The PCS 10a having received the command performs an operation based on the command.

The output unit 21 (FIG. 1) includes the liquid crystal display device 24 and the display changeover switch 25 of the operation panel 22. When receiving the power information provided from the display controller 10c, the output unit 21 causes the liquid crystal display device 24 to display the values of the various types of power indicated by the power information. The display changeover switch 25 is made up of four switches corresponding to generated power, consumed power, traded power, and charge/discharge power of the storage battery 10b in the consumer.

The display changeover switch 25 receives an operation selected by the operator using the four switches as to the value of which type of power among the generated power, the consumed power, the traded power, and the charge/discharge power of the storage battery 10b in the consumer is displayed on the liquid crystal display device 24.

For example, when the operator presses "generated power" in the display changeover switch 25, the output unit 21 causes the liquid crystal display device 24 to display the generated power in the consumer. When the operator presses "consumed," the output unit 21 causes the liquid crystal display device 24 to display the consumed power in the consumer. The output unit 21 causes the liquid crystal display device 24 to display information indicating the various types of power in response to the changeover made by the operator.

As described above, in the storage battery system 1, the display controller 10c of the main unit 10 and the output unit 21 of the remote controller 11 constitute a power display device 30 that displays the values of the various types of power in the consumer.

As described above, the display controller 10c calculates the value of each of the various types of power (generated power, consumed power, traded power, and charge/discharge power of the storage battery 10b) in the consumer where the own system 1 is installed based on the sensor output or the like provided from each of the sensors 12, 13, 14, 15.

The value calculated based on the sensor output from each sensor and the discharge power of the own system 1 are represented as follows.

Current value detected by first current sensor 12a: Iw1
Current value detected by second current sensor 12b: Iu1
Current value detected by generated-power detecting current sensor 13 provided in the second power line 4b: Iu2
Voltage value detected by first voltage sensor 14: Vw
Voltage value detected by second voltage sensor 15: Vu
Discharge power of own system 1: Pinv Note that each of the above values Iw1, Iu1, Iu2, Pinv indicates a positive value when the current flows in the direction of an arrow attached in the vicinity of each of the current sensors 12a, 12b, 13 and the storage battery system 1 in FIG. 1.

The display controller 10c calculates the generated power of each of the second power generator 6 and the first power generator 5 based on the following equation (1):

$$\text{Generated power}=(Iu2-Iu1)\times(Vu+Vw) \qquad (1)$$

As shown in the equation (1), the display controller 10c calculates the power, assuming that the current flowing to a position corresponding to the position of the generated-power detecting current sensor 13 in the first power line 4a has the same value as the generated-power detecting current sensor 13. The display controller 10c calculates the difference between the power obtained based on the sensor output from the generated-power detecting current sensor 13 and the power obtained based on the sensor output from the reverse current detection sensor 12, as the generated power of the second power generator 6 and the first power generator 5.

Further, the display controller 10c calculates the consumed power (consumed power of the general load 3) in the consumer based on the following equation (2):

$$\text{Power consumption}=Pinv-Pgrid \qquad (2)$$

Note that Pgrid is the power detected by the reverse current detection sensor 12 and is expressed as in the following equation (3):

$$Pgrid=Iw1\times Vw+Iu1\times Vu \qquad (3)$$

For the traded power, a value corresponding to Iu2 in the first power line 4a is a value obtained by adding the generated power (Iu2−Iu1) of the first power generator 5 and the second power generator 6 and the current value Iw1 detected by the first current sensor 12a.

Hence the display controller 10c calculates the traded power based on the following equation (4):

$$\text{Traded power}=(Iw1+(Iu2-Iu1))\times Vw+Iu2\times Vu \qquad (4)$$

Among the types of powers described above, Pgrid shows a positive value when the current is flowing in the reverse direction.

The generated power shows a positive value when being generated.

The discharge power Pinv of the own system 1 shows a positive value when being discharged.

The traded power shows a positive value when the current is flowing in the reverse direction.

The display controller 10c calculates the values of the various types of power based on the above equations (1) to (4) and causes the liquid crystal display device 24 of the output unit 21 to display the values.

Here, the display controller 10c is configured to calculate, as the generated power, a value being the sum of the generated power of the second power generator 6 and the generated power of the first power generator 5.

The generated-power detecting current sensor 13 included in the storage battery system 1 of the present embodiment is provided in the electrical circuit 4 such that the second power generator 6 and the first power generator 5 are connected between the reverse current detection sensor 12 and the generated-power detecting current sensor 13. That is, the generated-power detecting current sensor 13 is provided in the electrical circuit 4 such that the connection 5a of the first power generator 5 and the connection 6a of the second power generator 6 in the electrical circuit 4 are located between the reverse current detection sensor 12 and the generated-power detecting current sensor 13.

Therefore, the display controller 10c can calculate the generated power being the sum of the generated power of the second power generator 6 and the generated power of the first power generator 5 by applying the above equation (1) to the sensor outputs of the generated-power detecting current sensor 13 and the reverse current detection sensor 12.

That is, the display controller 10c calculates the difference between the power obtained based on the sensor output from the generated-power detecting current sensor 13 and the power obtained based on the sensor output from the reverse current detection sensor 12 as the generated power being the sum of the generated power of each of the power generators 5, 6.

In this case, the display controller 10c can calculate the total generated power without providing a current sensor for each of the second power generator 6 and the first power generator 5 added after the installation of the storage battery system 1.

Furthermore, also in a case where a further new power generator is added, when the new power generator to be added is connected between the generated-power detecting current sensor 13 and the reverse current detection sensor 12, the display controller 10c can calculate the generated power being the sum of the generated power of each of the second power generator 6, the first power generator 5, and the added power generator based on the sensor output of the generated-power detecting current sensor 13 and the sensor output of the reverse current detection sensor 12, even without provision of a new current sensor corresponding to the added power generator.

Therefore, the display controller 10c can cause the liquid crystal display device 24 of the remote controller 11 to display the generated power being the sum of the generated power of each power generator including the generated power of the added power generator.

As a result, according to (the power display device 30) of the system in the present embodiment, even when a power generator is newly added, it is possible to perform display coping with the addition of the power generator at low cost without adding a current sensor or the like.

Further, in the present embodiment, since the generated-power detecting current sensor 13 is provided only in the second power line 4b that is the u-phase, the appropriate display can be performed with the minimum configuration.

Figure 3:
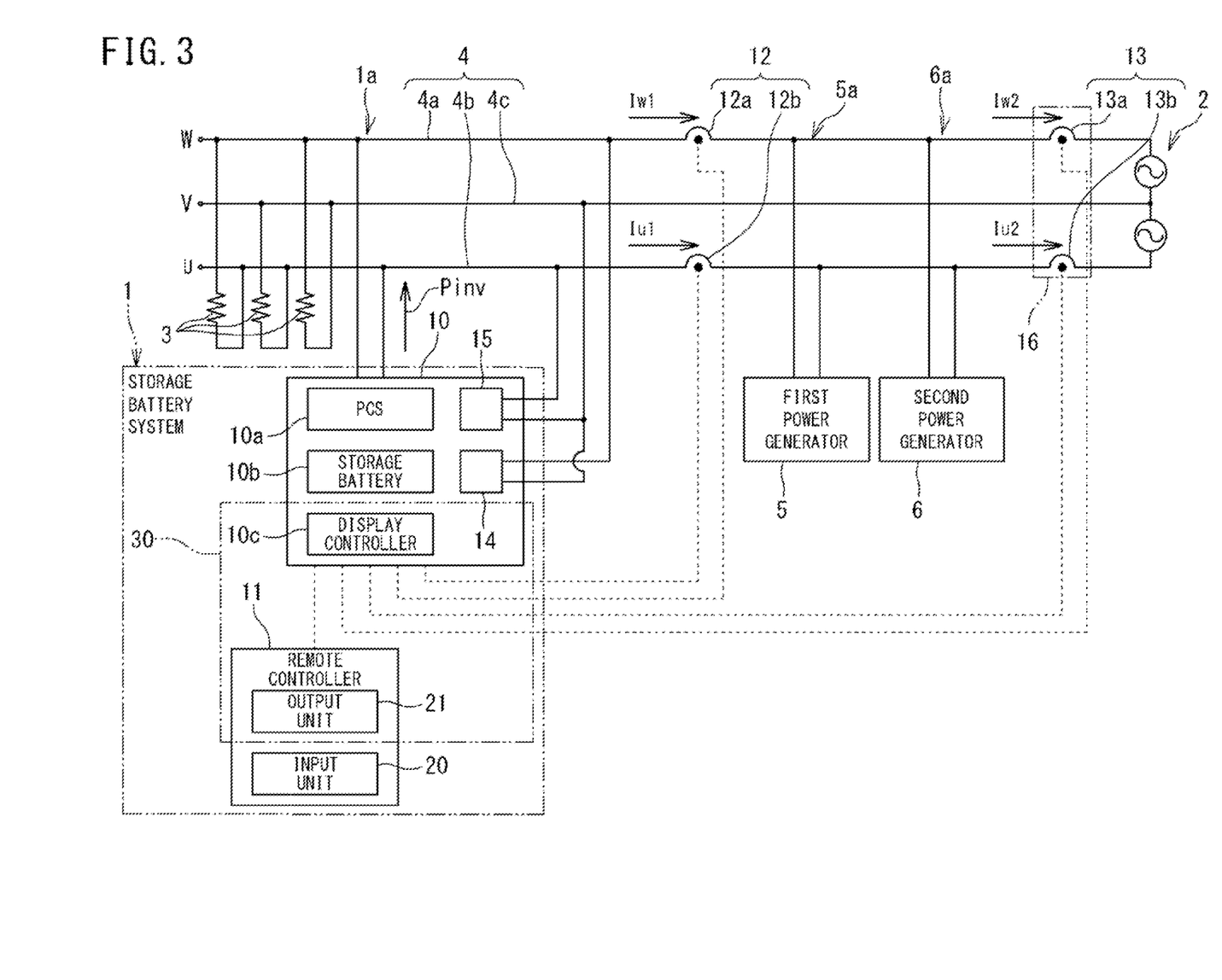
FIG. 3 is a diagram showing an equipment configuration in a consumer according to a modification of the first embodiment.

As shown in FIG. 3, it may be configured such that a generated-power detecting current sensor is also provided in the first power line 4a that is the w-phase. In this case, the generated-power detecting current sensor 13 is made up of a first sensor 13a provided in the first power line 4a that is the w-phase and a second sensor 13b provided in the second power line 4b that is the u-phase.

In this case, the display controller 10c calculates the generated power being the sum of the generated power of the second power generator 6 and the generated power of the first power generator 5 based on the following equation (5):

$$\text{Generated power} = (P\text{grid\_}w\_2 - P\text{grid\_}w\_1) + (P\text{grid\_}u\_2 - P\text{grid\_}u\_1) \quad (5)$$

Note that Pgrid_w_2 is the power detected by the first sensor 13a provided in the first power line 4a and is expressed as in the following equation (6):

$$P\text{grid\_}w\_2 = Iw2 \times Vw \quad (6)$$

In the above equation (6), Iw2 is a current value detected by the first sensor 13a.

Pgrid_w_1 is the power detected by the first current sensor 12a of the reverse current detection sensor 12 and is expressed as the following equation (7):

$$P\text{grid\_}w\_1 = Iw1 \times Vw \quad (7)$$

In the above equation (7), Iw1 is a current value detected by the first current sensor 12a and is a value similar to the above embodiment.

Pgrid_u_2 is the power detected by the second sensor 13b provided in the second power line 4b and is represented as in the following equation (8).

$$P\text{grid\_}u\_2 = Iu2 \times Vu \quad (8)$$

In the above equation (8), Iu2 is a current value detected by the first sensor 13a and is the same value as the current value detected by the generated-power detecting current sensor 13 provided in the second power line 4b in the above embodiment.

Pgrid_u_1 is the power detected by the second current sensor 12b of the reverse current detection sensor 12 and is expressed as in the following equation (9):

$$P\text{grid\_}u\_1 = Iu1 \times Vu \quad (9)$$

In the above equation (9), Iu1 is a current value detected by the second current sensor 12b and is a value similar to the above embodiment.

Further, the display controller 10c calculates the traded power based on the following equation (10):

$$\text{Traded power} = P\text{grid\_}w\_2 + P\text{grid\_}u\_2 \quad (10)$$

As shown in FIG. 3, when the generated-power detecting current sensor 13 is provided in each of the first power line 4a that is the w-phase and the second power line 4b that is the u-phase, the power can be measured for both the u-phase and the w-phase, so that it is possible to more accurately calculate the generated power being the sum of the generated power of each of the power generators 5, 6.

Second Embodiment

Figure 4:
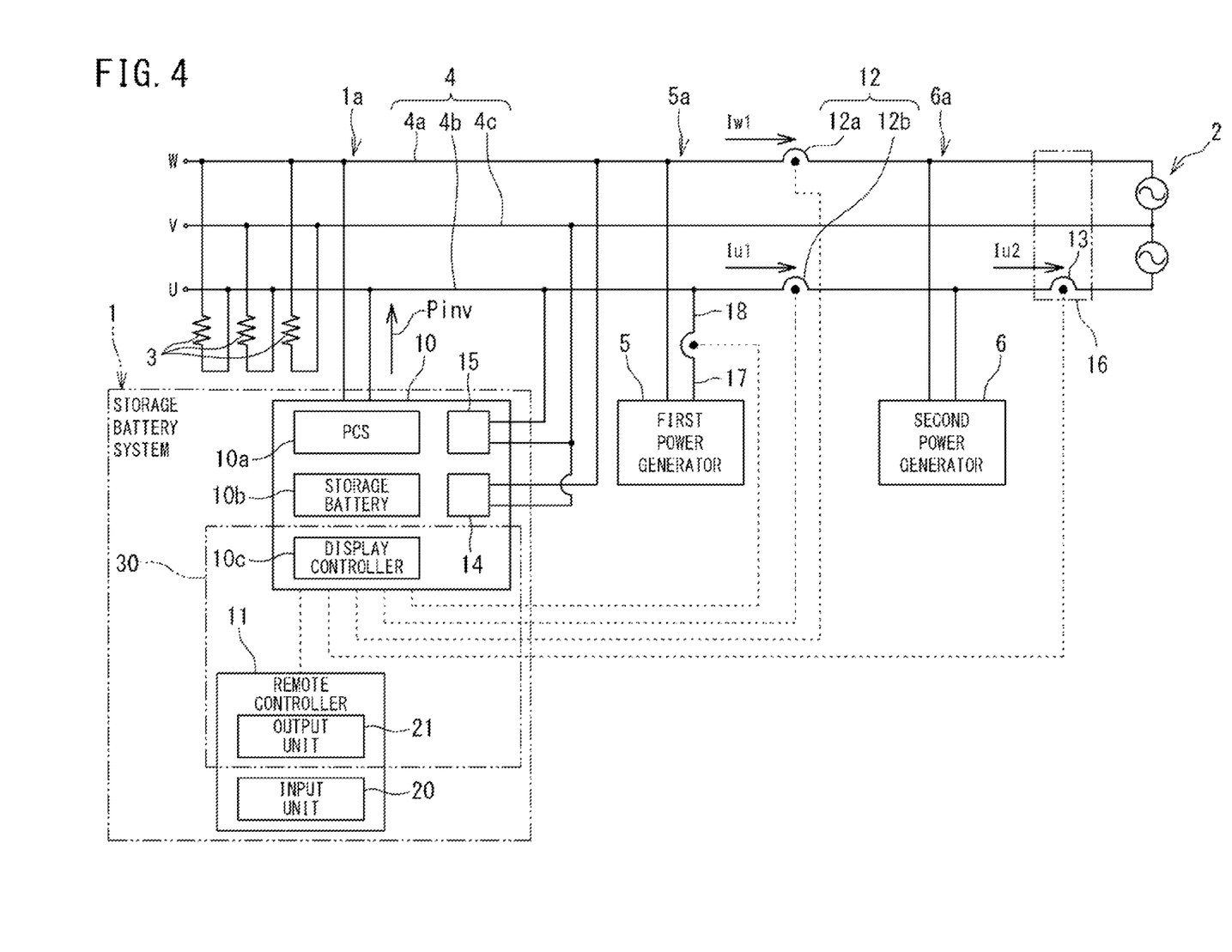
FIG. 4 is a diagram showing an equipment configuration in a consumer in which a storage battery system according to a second embodiment is installed.

FIG. 4 is a diagram showing an equipment configuration in a consumer in which the storage battery system 1 according to a second embodiment is installed.

The present embodiment differs from the first embodiment in that the reverse current detection sensor 12 is provided at a position between the connection 5a of the first power generator 5 and the connection 6a of the second power generator 6 in the electrical circuit 4, and a current sensor 18 for detecting the generated power of the first power generator 5 is provided in a branch line 17 connecting the second power line 4b of the electrical circuit 4 and the first power generator 5. The other configuration is the same as that of the first embodiment.

In the present embodiment, the so-called single power generation is adopted in which the storage battery system 1 does not discharge when the first power generator 5 is supplying generated power, and the first power generator 5 does not supply power when the storage battery system 1 is discharging.

Therefore, the PCS 10a of the storage battery system 1 determines whether or not the first power generator 5 is supplying generated power based on the sensor output provided from the current sensor 18. The PCS 10a controls the charge/discharge of the storage battery 10b so that the discharge is not performed when the first power generator 5 is supplying power, and the discharge is performed when the first power generator 5 is not supplying power.

Also, in the present embodiment, the generated-power detecting current sensor 13 is provided in the electrical circuit 4 such that the second power generator 6 is connected between the reverse current detection sensor 12 and the generated-power detecting current sensor 13. That is, the connection 6a of the second power generator 6 in the electrical circuit 4 is provided between the reverse current detection sensor 12 and the generated-power detecting current sensor 13.

Therefore, in a case where a new power generator is added, when the new power generator to be added is connected between the generated-power detecting current sensor 13 and the reverse current detection sensor 12, the display controller 10c can calculate the generated power being the sum of the generated power of each of the second power generator 6 and the added power generator based on the sensor output of the generated-power detecting current sensor 13 and the sensor output of the reverse current detection sensor 12, even without provision of a new current sensor corresponding to the added new power generator. As a result, it is possible to perform display coping with the addition of the power generator at low cost.

Third Embodiment

Figure 5:
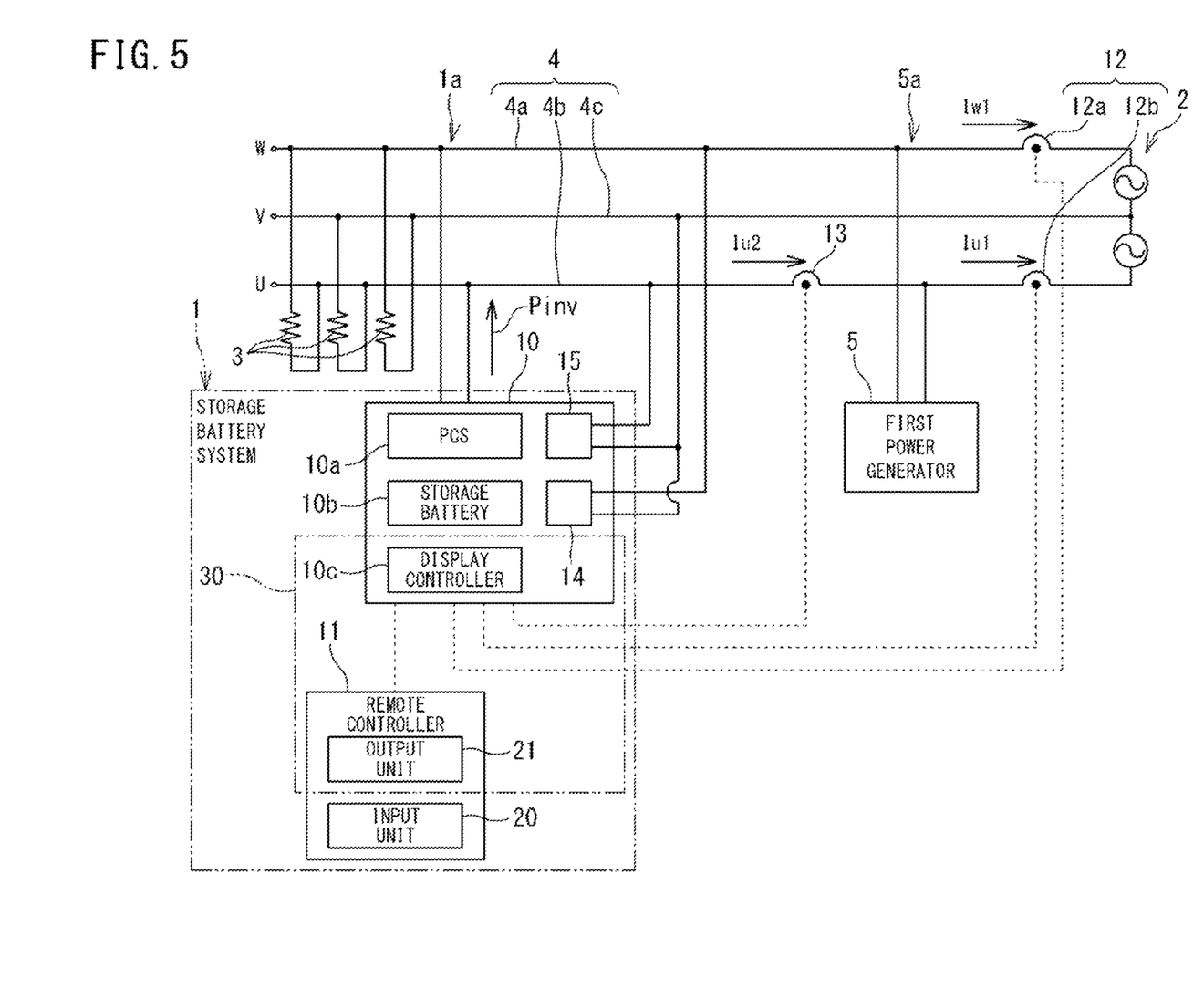
FIG. 5 is a diagram showing an equipment configuration in a consumer in which a storage battery system according to a third embodiment is installed.

FIG. 5 is a diagram showing an equipment configuration in a consumer in which the storage battery system 1 according to a third embodiment is installed.

The present embodiment differs from the first embodiment in that only the first power generator 5 is connected to the electrical circuit 4, the reverse current detection sensor 12 is provided between the connection 5a of the first power generator 5 and the commercial power grid 2 in the electrical circuit 4, and the generated-power detecting current sensor 13 is provided between the connection 1a of the storage battery system 1 and the connection 5a of the first power generator 5 in the electrical circuit 4.

In the present embodiment, the single power generation is adopted as in the second embodiment. The PCS 10a of the storage battery system 1 can calculate the generated power of the first power generator 5 from the sensor outputs of the generated-power detecting current sensor 13 and the reverse current detection sensor 12. Hence the PCS 10a determines whether or not the first power generator 5 is supplying the generated power based on the sensor outputs of the generated-power detecting current sensor 13 and the reverse current detection sensor 12.

The PCS 10a controls the charge/discharge of the storage battery 10b so that the discharge is not performed when the first power generator 5 is supplying power, and the discharge is performed when the first power generator 5 is not supplying power.

In the present embodiment, since the single power generation is adopted, it is not necessary to cause the reverse current detection sensor 12 to detect only the reverse flow of the discharge power of the storage battery system 1. Therefore, the reverse current detection sensor 12 is provided closer to the commercial power grid 2 than the generated-power detecting current sensor 13 is.

Also, in the present embodiment, the generated-power detecting current sensor 13 is provided in the electrical circuit 4 such that the first power generator 5 is connected between the reverse current detection sensor 12 and the generated-power detecting current sensor 13. That is, the connection 5a of the first power generator 5 in the electrical circuit 4 is provided between the reverse current detection sensor 12 and the generated-power detecting current sensor 13.

Therefore, in a case where a new power generator is added, when the new power generator to be added is connected between the generated-power detecting current sensor 13 and the reverse current detection sensor 12, the display controller 10c can appropriately display generated power even without provision of a new current sensor corresponding to the added new power generator.

In the present embodiment, the new power generator to be added between the reverse current detection sensor 12 and the generated-power detecting current sensor 13 is limited to a solar power generator. This is because it is necessary to determine whether or not the solar power generator is supplying generated power in order for the PCS 10a of the storage battery system 1 to perform control as the single power generation.

OTHERS

Note that the embodiments disclosed herein should be considered as illustrative and not restrictive in every respect. The first power generator 5 and the second power generator 6 in each of the embodiments may only be a power generator such as a solar power generator or a fuel cell power generator, a combination of power generators of the same type may be possible other than a combination of power generators of different types, and there is no limitation on the combination.

In FIGS. 1, 4, and 5, the case has been shown where the generated-power detecting current sensor 13 is provided only in the second power line 4b, but the generated-power detecting current sensor 13 may be provided only in the first power line 4a.

The scope of the present invention is shown not by the meanings described above but by the scope of the claims and is intended to include the meanings equivalent to the scope of the claims and all modifications within the scope.

REFERENCE SIGNS LIST

1: STORAGE BATTERY SYSTEM
1a: CONNECTION
2: COMMERCIAL POWER GRID
3: GENERAL LOAD

4: ELECTRICAL CIRCUIT
4a: FIRST POWER LINE
4b: SECOND POWER LINE
4c: THIRD POWER LINE
5: FIRST POWER GENERATOR
5a: CONNECTION
6: SECOND POWER GENERATOR
6a: CONNECTION
10: MAIN UNIT
10a: POWER CONDITIONER
10b: STORAGE BATTERY
10c: DISPLAY CONTROLLER
11: REMOTE CONTROLLER
12: REVERSE CURRENT DETECTION SENSOR
12a: FIRST CURRENT SENSOR
12b: SECOND CURRENT SENSOR
13: GENERATED-POWER DETECTING CURRENT SENSOR
13a: FIRST SENSOR
13b: SECOND SENSOR
14: FIRST VOLTAGE SENSOR
15: SECOND VOLTAGE SENSOR
16: DISTRIBUTION BOARD
17: BRANCH LINE
18: CURRENT SENSOR
20: INPUT UNIT
21: OUTPUT UNIT
22: OPERATION PANEL
23: OPERATION SWITCH GROUP
24: LIQUID CRYSTAL DISPLAY DEVICE
25: DISPLAY CHANGEOVER SWITCH
30: POWER DISPLAY DEVICE

The invention claimed is:

1. A storage battery system comprising:
an electrical circuit connecting a grid and a general load,
a storage battery connected to a first connection on the electrical circuit,
a first current sensor provided between the first connection and the grid in the electrical circuit,
one or more power generators connected to a second connection between the first current sensor and the grid in the electrical circuit,
a second current sensor provided between the second connection and the grid in the electrical circuit, and
a controller that calculates generated power of the one or more power generators based on outputs obtained from the first current sensor and the second current sensor,
wherein the controller calculates a difference between power obtained based on the output of the first current sensor and power obtained based on the output of the second current sensor as generated power of the one or more power generators.

2. The storage battery system according to claim 1, wherein
the second current sensor is provided in one of two power lines included in the electrical circuit.

3. The storage battery system according to claim 1, wherein
the second current sensor is provided in each of two power lines included in the electrical circuit.

4. The storage battery system according to claim 1, wherein the second current sensor is provided closer to the grid than the first current sensor is.

5. A power display device used for a storage battery system that includes
an electrical circuit connecting a grid and a general load,
a storage battery connected to a first connection on the electrical circuit,
a first current sensor provided between the first connection and the grid in the electrical circuit, and
one or more power generators connected to a second connection between the first current sensor and the grid in the electrical circuit,
the power display device comprising:
a second current sensor provided between the second connection and the grid in the electrical circuit, and
a controller that calculates generated power concerning the one or more power generators based on outputs obtained from the first current sensor and the second current sensor,
wherein the controller calculates a difference between power obtained based on the output of the first current sensor and power obtained based on the output of the second current sensor as generated power of the one or more power generators.

6. The storage battery system of claim 1, further comprising:
a voltage sensor connected to the electrical circuit, wherein
the controller calculates the generated power of the one or more power generators based on outputs obtained from the first current sensor, the second current sensor, and the voltage sensor.

* * * * *